United States Patent
Cam-Winget et al.

(10) Patent No.: US 11,443,230 B2
(45) Date of Patent: Sep. 13, 2022

(54) INTRUSION DETECTION MODEL FOR AN INTERNET-OF-THINGS OPERATIONS ENVIRONMENT

(71) Applicant: Cisco Technology, Inc., San Jose, CA (US)

(72) Inventors: Nancy Cam-Winget, Mountain View, CA (US); Subharthi Paul, San Jose, CA (US); Blake Anderson, Chapel Hill, NC (US); Saman Taghavi Zargar, Milpitas, CA (US); Oleg Bessonov, San Jose, CA (US); Robert Frederick Albach, Austin, TX (US); Sanjay Kumar Agarwal, Fremont, CA (US); Mark Steven Knellinger, Franklin, TN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1030 days.

(21) Appl. No.: 16/135,756

(22) Filed: Sep. 19, 2018

(65) Prior Publication Data

US 2019/0236493 A1    Aug. 1, 2019

Related U.S. Application Data

(60) Provisional application No. 62/622,558, filed on Jan. 26, 2018.

(51) Int. Cl.
*G06N 20/00* (2019.01)
*H04L 9/40* (2022.01)
(Continued)

(52) U.S. Cl.
CPC .......... *G06N 20/00* (2019.01); *G06K 9/6257* (2013.01); *G06K 9/6267* (2013.01); *G06N 5/045* (2013.01);
(Continued)

(58) Field of Classification Search
CPC ........ G06N 20/00; G06N 5/045; G06N 20/20; G06N 7/005; G06N 20/10; G06K 9/6257;
(Continued)

(56) References Cited

U.S. PATENT DOCUMENTS 9,900,332 B2    2/2018  Muddu et al.
2017/0006141 A1*  1/2017  Bhadra .................. H04W 84/18
(Continued)

FOREIGN PATENT DOCUMENTS

| CN | 107135093 | 9/2017 |
| WO | WO 2017/004574 | 1/2017 |
| WO | WO 2017/035536 | 3/2017 |

OTHER PUBLICATIONS

International Search Report and Written Opinion from the International Searching Authority, dated Apr. 29, 2019, 15 pages, for corresponding International Patent Application No. PCT/US2019/014762.

(Continued)

*Primary Examiner* — Michael A Keller
*Assistant Examiner* — Jsing Forng Lin
(74) *Attorney, Agent, or Firm* — Polsinelli PC

(57) ABSTRACT

A trained model may be deployed to an Internet-of-Things (IOT) operational environment in order to ingest features and detect events extracted from network traffic. The model may be received and converted into a meta-language representation which is interpretable by a data plane engine. The converted model can then be deployed to the data plane and may extract features from network communications over the data plane. The extracted features may be fed to the deployed model in order to generate event classifications or device state classifications.

20 Claims, 7 Drawing Sheets

(51) Int. Cl.
*G06N 5/04* (2006.01)
*G06N 20/20* (2019.01)
*G06K 9/62* (2022.01)
*G06N 7/00* (2006.01)
*G06N 20/10* (2019.01)
*H04L 67/12* (2022.01)
*H04L 67/00* (2022.01)

(52) U.S. Cl.
CPC ......... *G06N 20/20* (2019.01); *H04L 63/1416* (2013.01); *H04L 63/1425* (2013.01); *G06N 7/005* (2013.01); *G06N 20/10* (2019.01); *H04L 67/12* (2013.01); *H04L 67/34* (2013.01)

(58) Field of Classification Search
CPC .............. G06K 9/6267; H04L 63/1416; H04L 63/1425; H04L 67/12; H04L 67/34
See application file for complete search history.

(56) References Cited

U.S. PATENT DOCUMENTS

| | | | |
|---|---|---|---|
| 2017/0063903 A1* | 3/2017 | Muddu | G06F 16/24578 |
| 2018/0060759 A1* | 3/2018 | Chu | G06N 20/00 |
| 2018/0096261 A1* | 4/2018 | Chu | G06N 7/005 |
| 2019/0132205 A1* | 5/2019 | Du | H04L 41/0893 |
| 2019/0236132 A1* | 8/2019 | Zhu | G06N 20/20 |
| 2021/0109718 A1* | 4/2021 | Brown | G06F 8/35 |

OTHER PUBLICATIONS

Shone et al., "A Deep Learning Approach to Network Intrusion Detection," IEEE Transactions on Emerging Topics in Computational Intelligence, Nov. 2017, pp. 1-10.

Fu et al., "An Automata Based Intrusion Detection Method for Internet of Things," Hindawi, Mobile Information Systems, vol. 2017, Article ID 1750637, May 2, 2017, pp. 1-14.

* cited by examiner

INTRUSION DETECTION MODEL FOR AN INTERNET-OF-THINGS OPERATIONS ENVIRONMENT

CROSS-REFERENCES

This patent application is related to and claims priority under 35 U.S.C. § 119(e) from U.S. Provisional Application No. 62/622,558, filed Jan. 26, 2018 entitled "SYSTEM FOR INTRUSION DETECTION OF INTERNET-OF-THINGS OPERATIONS ENVIRONMENT," the entire contents of which is incorporated herein by reference for all purposes.

FIELD

The present invention generally relates to machine learning model deployment and execution in an Internet-of-Things (IOT) environment, and more specifically relates to detecting intrusion or anomalous behavior in an IOT environment.

BACKGROUND

Advances in IoT technologies present new security challenges, given the vast number of devices, their generally minimalistic sophistication, and their supposed ease of use (e.g., "plug and play"). Further, IOT devices often output data flows in an aggregated and/or singular form. As a result, it can be challenging or impossible to retrieve information about the state of a subsystem or component of an IOT device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which.

DESCRIPTION OF EXAMPLE EMBODIMENTS

Figure 1:
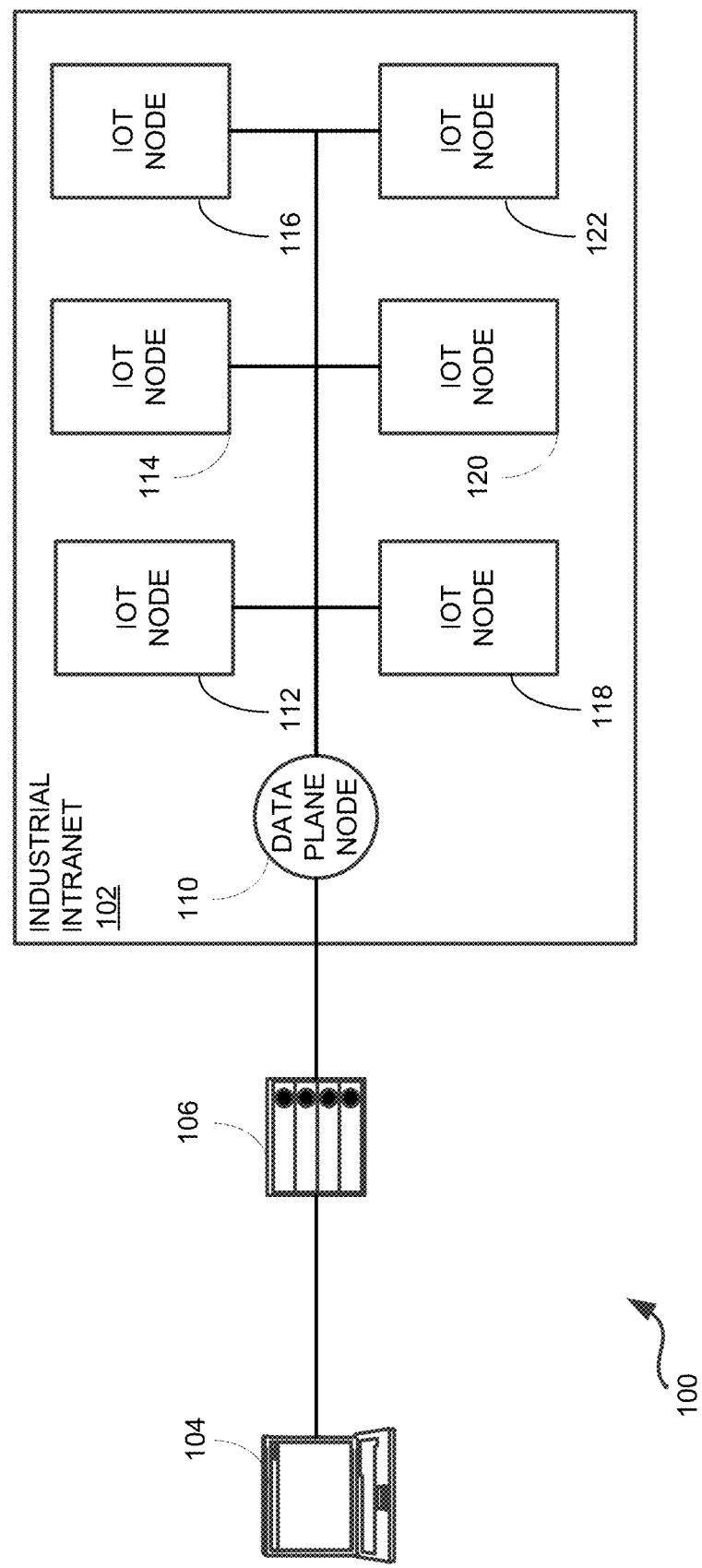
FIG. 1 illustrates an example operating environment, according to various embodiments of the subject technology.

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

Overview

Typical classification systems, such as intrusion detection systems and the like, often rely on a dedicated and/or rigid "analytic engine" in order to evaluate a fixed set of behavioral models and perform data plane inspection to detect intrusions. Similarly, the same engine is used to refine the behavioral model. While general 'analytic' platforms (e.g. Splunk and the like) exist to enable the development of behavioral models using different analysis algorithms, they are detached from the actual detection, reporting, and enforcement of anomalous behavior.

Traditional signature-based intrusion detection systems (IDS) typically rely on a priori knowledge of expected behavior or known threats. That is, they focus more on being able to detect known threats at very high speeds by identifying particular patterns such as "signatures", which are typically relatively simple and may, for example, be identified with as few as a single classifier. Signature-based techniques are not very robust against metamorphic and polymorphic threats.

In comparison behavioral analytics can offer effective threat and anomaly detection for IOT systems. IOT systems are generally designed for precise, well-defined, and deterministic sensor-actuator control systems and so behavioral models can be used to effectively determine various device states within the IOT system and to identify possible threats to the IOT system. As a result, properly defined behavioral analytics and associated workflow may address many of the disadvantages of signature-based techniques. For example, behavioral analytics can detect new and otherwise unknown threats and may also be resilient to polymorphic and metamorphic threats.

Typical behavioral analytics for IoT systems, such as IDS and the like, are designed for narrow use-cases. Additionally, offline and/or continuous model creation/learning is typically deeply coupled with online evaluation stages. In other words, a data plane related to such system may represent only a particular modeling paradigm that is most relevant to the use-case being addressed. However, IOT devices and use-cases are extremely diverse and may span myriad modeling paradigms which may be incompatible with the narrowly structured data plane.

Aspects of the disclosed technology decouple model creation and tuning from model execution phases (e.g., threat detection phases). Domain experts may create and refine any model that would be relevant to a particular use case, ranging from complex Machine Learning (ML) classifiers to simple statistical models, and then deploy the model directly to a data plane for an IOT system.

In some embodiments, a trained ML model can be converted into a meta-language representation. The meta-language representation of the trained ML model can then be deployed to a data plane of network communications for an IOT operations environment. The deployed meta-language representation of the trained ML model can ingest extracted features from network communications across the data plane in order to identify events and/or a state of a device within the IOT operations environment.

Example Embodiments

In some embodiments, model creation and learning may be done offline and a trained model can be dropped into a programmable data plane for online evaluation of streaming network traffic. The data plane design may provide programmatic primitives to express a wide range of different ML and statistical models that can be evaluated in near-real time over network traffic. For example, support vector machine (SVM), dynamic Bayesian network (DBN), and Bayesian models may be deployed, separately or as an ensemble model, to the data plane.

Models can be represented in a semantically rich model specification language. This allows models that are created and trained in an offline stage to be easily deployed to the data plane. The deployed models may then be re-instantiated over the data plane and provided inputs via programming primitives of the model specification language. For example, the model specification language may include an "extract" primitive for identifying features from network protocols such as subsystem device state, communications target, time-dimension data, and the like. The extracted features can then be ingested by the model deployed to the data plane in order to perform classification functions and the like.

Processing data on the data plane, the deployed models may make predictions about device and system state as the data is produced (e.g., in the "live" environment) rather than based on historical data. Some data-driven modeling approaches can be used for specific IoT use-cases while being otherwise poorly-suited for generalizing over varied devices and/or use cases. For example, support vector machines, clustering, and nearest neighbor techniques do not perform well for large quantities of data and make inferences as an artifact of historical patterns of data without reflecting state changes in the process that generated the data. Techniques such as neural networks, support vector machines (SVMs), and decision trees also require large quantities of diverse training data. In security use cases, such as when considering probabilistic anomaly detection, contextual insights may be important to accurately identifying a threat but are often unavailable in "black box" techniques (e.g., neural networks and the like which may not provide clear indicators of which features cause which classifications—or why).

Because IoT behavioral analytics use cases span multiple ML and statistical modeling paradigms, a "general" IoT behavioral design may be improved by supporting each of these different modeling paradigms (e.g., SVM, clustering, nearest neighbor, etc.). A decoupled (e.g., offline model creation and online evaluation phases) may allow a user to choose from a wide variety of different ML and statistical modeling paradigms, and instantiate the chosen paradigm (or paradigms) over a semantically rich programmable data plane for online evaluation.

In some embodiments, an initial graphical model creation phase, similar to a structural learning phase in graphical modeling techniques such as Bayesian Networks or Dynamic Bayesian Networks, may bridge the gap between domain experts (e.g., security experts and ML experts, etc.). In this phase, domain experts can specify different system variables and interdependencies based on domain expertise and knowledge. Security experts can then use the system description to overlay it with data-oriented models and train these models for anomaly detection. In effect, a security expert threat model can be overlaid onto a domain expert modeled system model.

In some embodiments, a process for deploying a model can be categorized in three abstracted steps. In particular, the steps can be loosely summarized as modeling, transfer, and instantiation. In some examples, feedback loops, interim steps, or other additions can be made to the abstracted process. For example, in an online learning implementation, instantiation may feed into modeling, transfer of online learning updates, and re-instantiation.

An IoT system or process may be first modeled offline. In some embodiments, offline modeling may take place via, for example, a computer-assisted design (CAD) software. In some embodiments, the CAD software may further provide a blue print or expected operational behavior for a specified system which may be mapped with other tools performing an IOT device discovery as part of generating a behavioral model based on expected operational behaviors and the like of the specified system. In other words, the CAD software can discover IOT devices on, for example, an industrial network intranet, and the discovered devices may be provided to a user.

In some embodiments, the user can generate a system description using domain expertise and graphical modeling techniques. For example, the user may include communications (e.g., generally insofar that communications at all are occurring, or more specifically insofar as a manner of communication, such as timing, protocols, environmental conditions, etc.) between certain devices as relevant to detecting device perform such as, by way of example and without imputing limitation, communications between two particular IOT devices which the user may know, based on domain expertise, to communicate only in circumstances where an internal device failure of one or the other particular IOT devices has occurred (e.g., as between a device and a second device assigned to provide backup support during a systems failure and such). As a result, a graphical description of a system represented through a set of system variables and variable interdependencies may be generated.

The graphical description system representation may then be converted into a statistical and/or ML model. In some embodiments, this process may be done automatically based on scripts linked with particular user selections (e.g., a model selection, etc.) or via input by a security expert. In some examples, multiple models can be generated by the conversion in order to identify the most effective of the models at a later step.

Once the model or models are generated, parameters may be learned through training processes. Parameters can include weights, values, and other components of a trained model as will be apparent to a person having ordinary skill in the art. Generally, model training is accomplished by providing the model with appropriately sized data sets and iteratively adjusting for prediction errors at each model training pass. In some embodiments, such as during online training, the model may continue to undergo training while deployed (e.g., live training, etc.) or during scheduled training updates using records generated by networks to which the model is deployed.

Nevertheless, once the model is trained or otherwise ready for deployment, it may be converted into a standard representation. The standard representation may be within a meta-language (e.g., a scripting language and the like) and, in some embodiments, can include various primitives including functional primitives. Functional primitives may include, for example and without imputing limitation, "extract( )," "encode( )", "flatten( )", "logistic_regression( )," etc. An example standard representation within the meta-language may be as below:

a=stream("ip")
b=a:extract({"tls.vals", "tls.chars"})
   :encode("tls.vals", {0, 154, 153, 1, 152})
   :flatten( )
   :logistic_regression({1, 0, 1, −1, 1, 0.01})

The converted model can then be instantiated online via the programmable data plane. In particular, the programmable data plane may read the standard form model and instantiate it over the data plane programming semantics for online evaluation of streaming network data. In other words, the data plane may computably interpret, for example, the standard representation discussed above to evaluate data streaming from "ip." Said another way, the instantiation may interpret the meta-language and be mapped to a set of evaluation primitives (e.g., flattens, encodes, etc.) that in turn can be converted into inputs to analytic specific techniques (e.g., logistic regressions, probit regressions, etc.).

To better understand the system and methods discussed above, the disclosure now turns to discussion of certain example embodiments. It is understood that while particular embodiments are herein disclosed, other implementations and embodiments may differ from those of the included figures while still adhering to the spirit of the invention.

Figure 2:
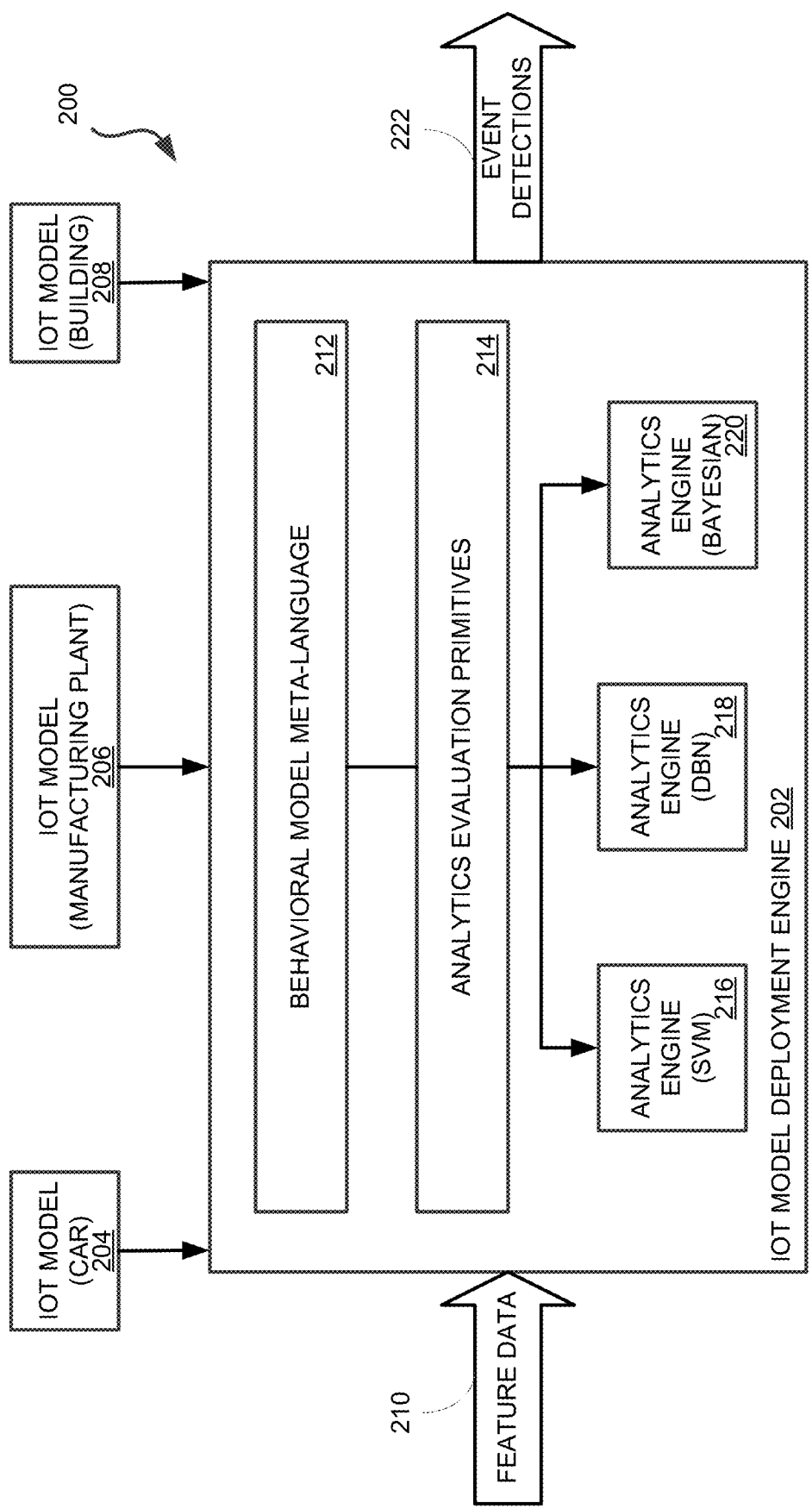
FIG. 2 illustrates an example deployment engine, according to various embodiments of the subject technology.
Figure 3:
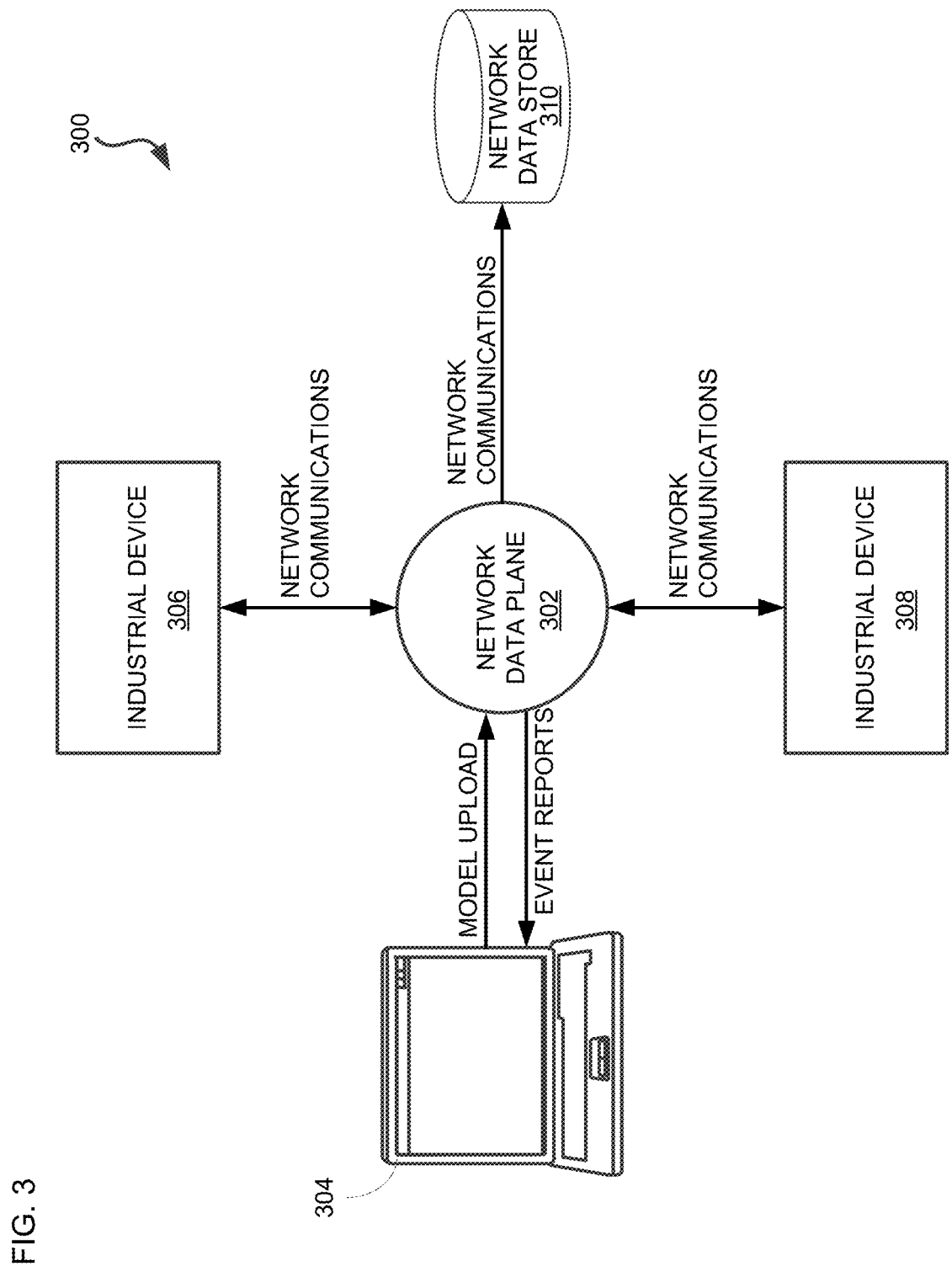
FIG. 3 illustrates an example deployment environment and data flow for the deployment engine of FIG. 2, according to various embodiments of the subject technology.
Figure 4:
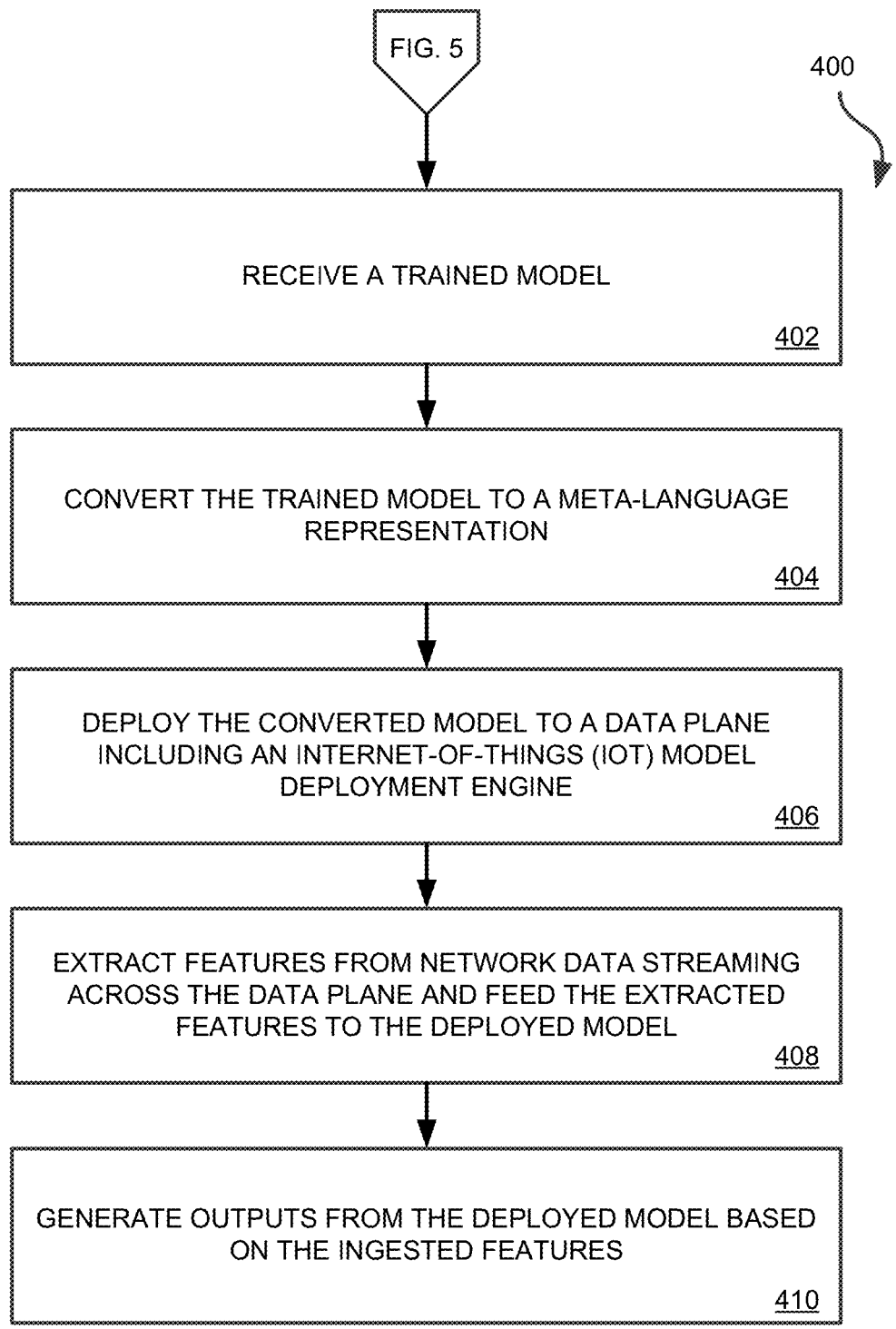
FIG. 4 illustrates an example method for deploying a trained model, according to various embodiments of the subject technology.
Figure 5:
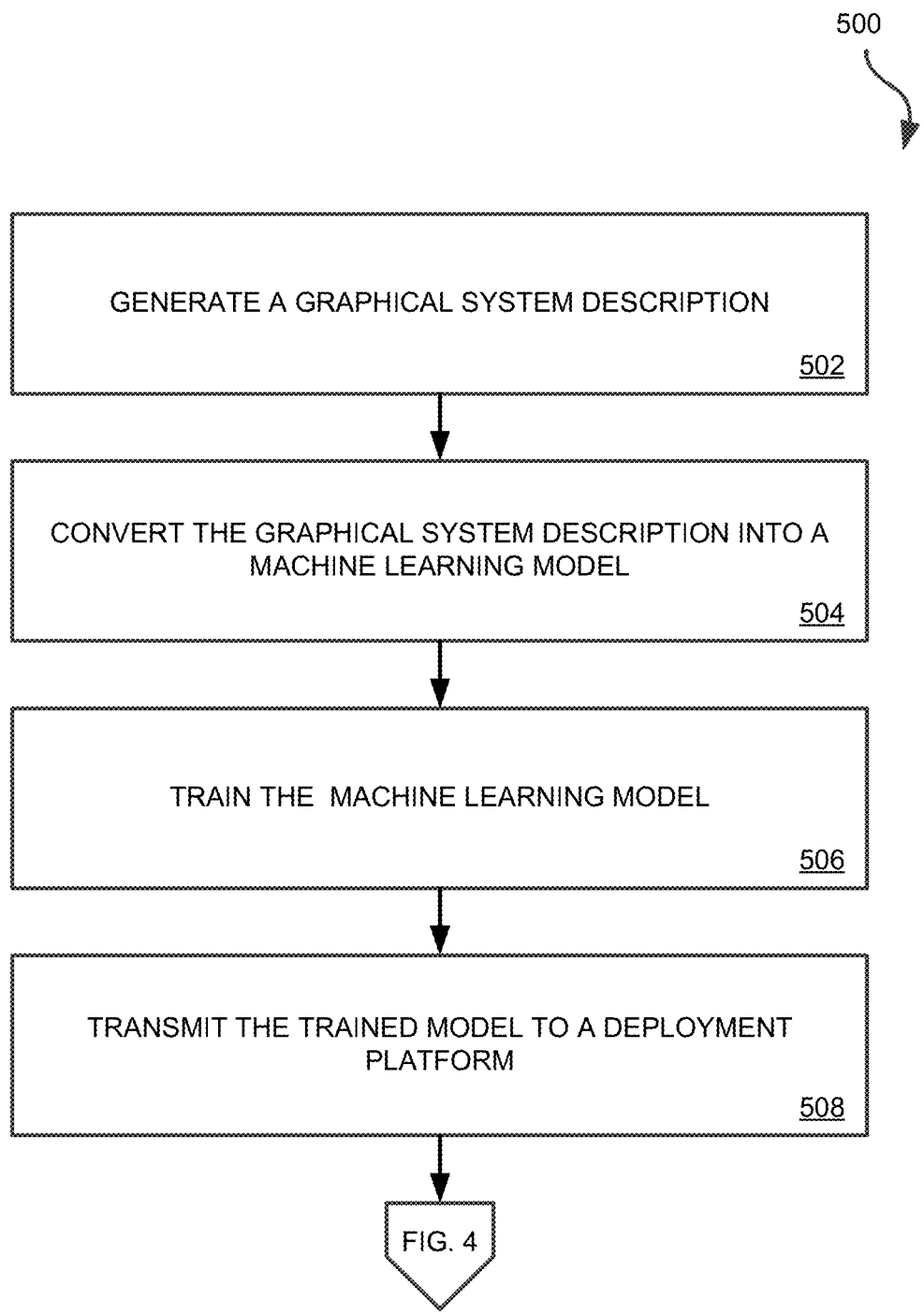
FIG. 5 illustrates an example method for training a model, according to various embodiments of the subject technology.
Figure 6:
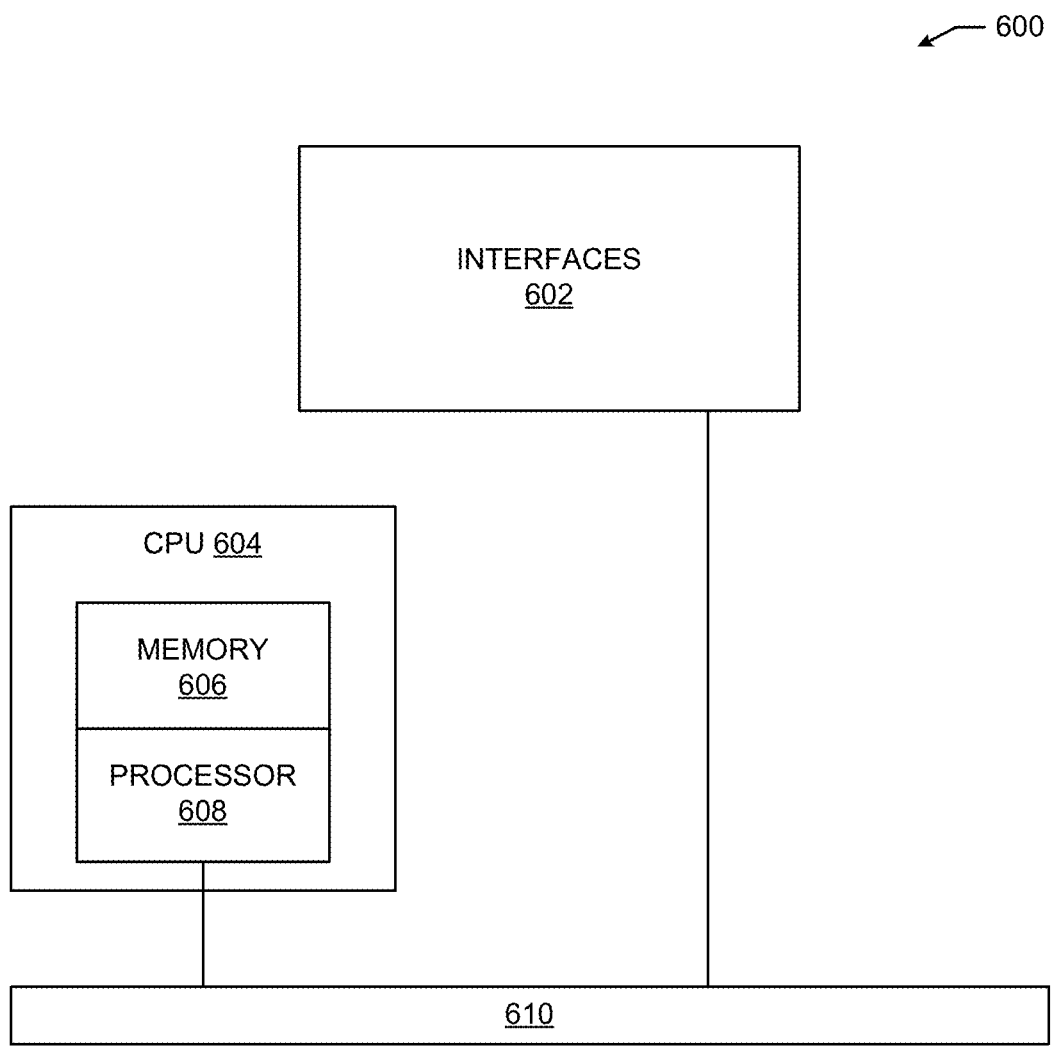
FIG. 6 illustrates an example network device, according to various embodiments of the subject technology.
Figure 7:
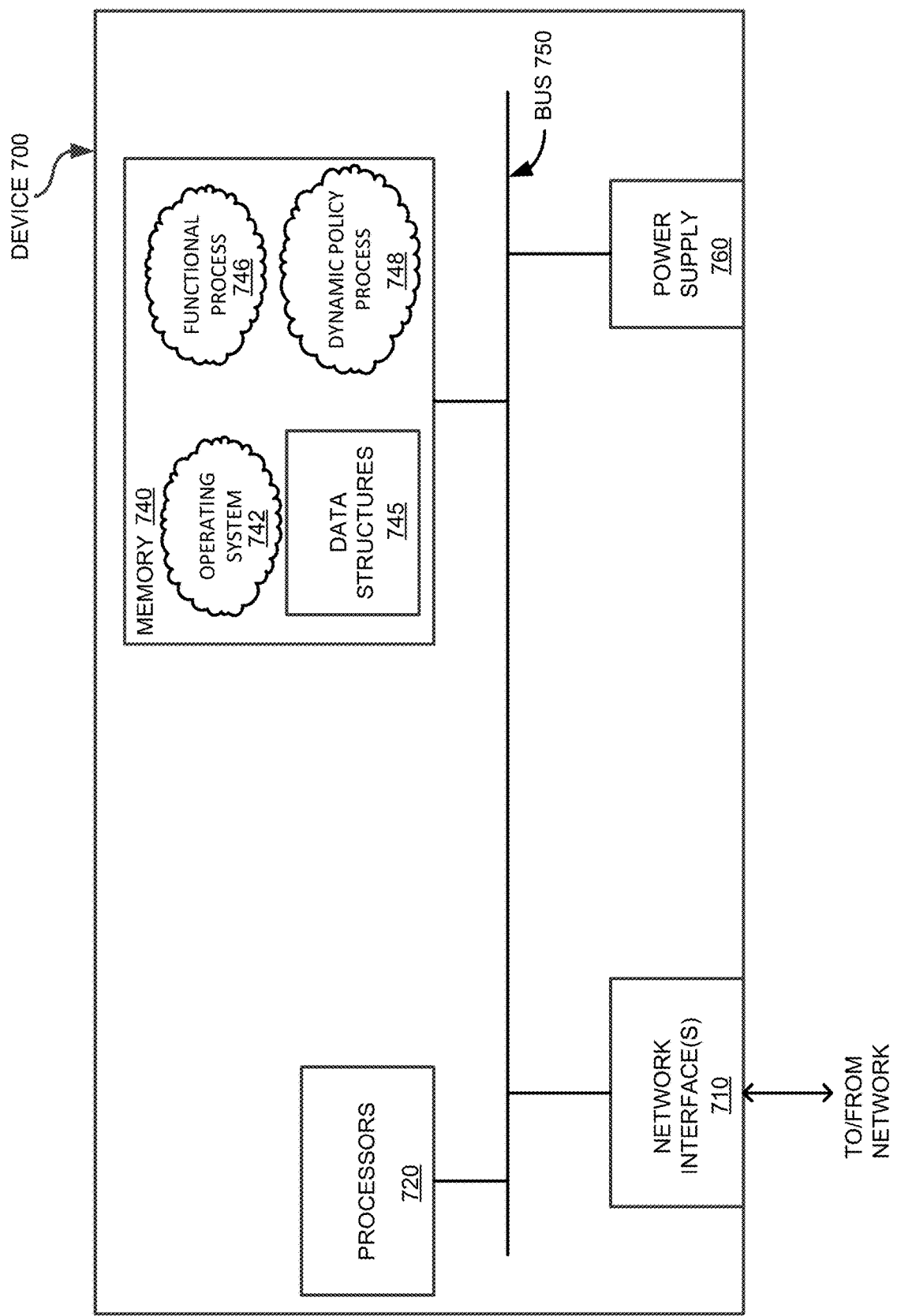
FIG. 7 illustrates an example computing device, according to various embodiments of the subject technology.

An example operating environment in which an Internet-of-Things (IOT) deployment engine may operate is illustrated in FIG. 1. FIG. 2 depicts a block model of an Internet-of-Things (IOT) deployment engine itself and FIG. 3 illustrates an example data flow using the Internet-of-Things (IOT) deployment engine. FIGS. 4 and 5 illustrate methods for training and deploying, for example, an Internet-of-Things (IOT) model. FIGS. 6 and 7 depict some background on device and network infrastructure in which some aspects of the technology may be practiced.

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

In various embodiments, computer networks may include an Internet-of-Things (IOT) network. Loosely, the term "Internet-of-Things" or "IOT" (or "Internet-of-Everything" or "IOE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet-of-Things" thus generally refers to the interconnection of objects (e.g., smart objects), such as sensors and actuators, over a computer network (e.g., via IP and/or as an intranet), which may include the public Internet or a private network.

Often, Internet-of-Things (IOT) networks operate within a shared-media mesh network, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. Internet-of-Things (IOT) networks may include anything from a few dozen to thousands or even millions of devices, and can support point-to-point traffic (between devices inside the network), point-to-multipoint traffic (from a central control point such as a root node to a subset of devices inside the network), and multipoint-to-point traffic (from devices inside the network towards a central control point). A data plane generally refers to the various nodes, routers, switches, and other services used to manage a network by, for example and without imputing limitation, providing connectivity and communications between devices, etc. That is, the data plane of a network typically includes devices, programs, protocols and the like to effectively move data between endpoints (e.g., IOT devices) within the network. Those skilled in the art will understand that any number of nodes, devices, links, etc. may be used in the computer network, and that the view shown herein is for simplicity.

FIG. 1 depicts an operating environment 100 which may be managed by a programmable data plane. In particular, industrial intranet 102 may include the programmable data plane. In some examples, computer terminal 104 and server 106 may connect to industrial intranet 102 externally (e.g., SSH tunnel over the Internet, etc.) or may be local to the network (e.g., on-site data or controller hubs and the like).

Industrial intranet 102 may include a data plane node 110 for executing, for example and without imputing limitation, routing services and such. In some examples, data plane node 110 may be an actual router interconnecting IOT nodes 112-122. In effect, network traffic between IOT nodes 112-122 or between a node and an endpoint external to industrial intranet 102 may be processed and directed by data plane node 110. While depicted here as a single node, it will be understood by a person having ordinary skill in the art that the data plane may include multiple data plane nodes and be a full network topology including, for example, multiple routers, switches, firewalls, etc. In some examples, data plane node 110 may include programmable components having compute capability, memory, and the like.

IOT nodes 112-122 may be identical devices or distinct devices. Further, in some examples, IOT nodes 112-122 may include hardware and/or virtualized device endpoints within industrial intranet 102. An example of an industrial intranet with various IOT nodes may include various networked industrial devices such as in, for example and without imputing limitation, an automated manufacturing and/or assembly location.

Computer terminal 104 may deploy a model, as discussed above, to data plane node 110. In some examples, a user (e.g., a developer, security analyst, data scientist, etc.) can generate a model at computer terminal 104 via, for example and without imputing limitation, a computer assisted design (CAD) program and the like. The model may be based on any or all of IOT nodes 112-122 and, for example, can include an internal state of various components, either observed directly or derived, communication patterns, and various other characteristics of industrial intranet 102.

In some examples, server 106 may receive the model from computer terminal 104 in order to eventually deploy the model to data plane node 110. In particular, server 106 may convert the model into a meta-language interpretable by a programmable data plane as discussed above. Even though FIG. 1 depicts server 106 for performing conversion, it is understood that, in some examples, model conversion may be performed locally on computer terminal 104, data plane node 110, or through steps performed various across computer terminal 104, server 106, and/or data plane node 110. In some examples, server 106 may store the model and/or the converted model for later retrieval and review.

Data plane node 110 may include a deployment engine such as, for example, that depicted in FIG. 2 and discussed below. In particular, FIG. 2 illustrates a system 200 for deploying a converted model. System 200 may be overlaid or integrated into a network data plane by, for example, being installed in one or more routers.

An IOT (Internet-of-Things) model deployment engine 202 receives an IOT model for deploying to a data plane (e.g., via data plane node 110, etc.). In some examples, multiple models may be received to execute individually over the data plane or the models may be executed in combination. For example, an IOT building model 208 may include various other IOT models such as an IOT HVAC model, electric systems models, network models, and the like as will be understood by a person having ordinary skill in the art. An IOT car model 204 may likewise include, for example and without limitation, an IOT GPS model, braking system model, power system model, etc. Similarly, an IOT manufacturing plant model 206 may include, for example and without limitation, an IOT manufacturing device mode, assembly device model, controller model, and so on.

Having received an appropriate IOT model, IOT model deployment engine 202 may then receive feature data 210 in order to detect events. Feature data 210 may be provided as raw data packets streaming over the network and may be processed by IOT model deployment engine 202 to extract data according to design parameters of a deployed model.

Detected events can be output as event detections 222 and may be transmitted to various downstream devices, APIs, and the like. Event detections 222 may include, for example, network intrusions, device failures, device successes, anomalies, and such. In some examples, event detections 222 may be transmitted to a monitoring terminal as an alert to be reviewed and analyzed. In some examples, event detections 222 may be provided to a downstream remediation system and the like.

IOT model deployment engine 202 includes a behavioral model meta-language 212 in which IOT models 204-208 are processed. Behavioral model meta-language 212 is interpretable by IOT model deployment engine 202 and, in some examples, may be syntactically similar to human readable programming languages. For example, behavioral model meta-language 212 may be presented to a user in terms of functional calls and the like as discussed above (e.g., "flatten ( )," "regression( )," etc.).

IOT model deployment engine 202 can generate analytics evaluation primitives 214 by, for example, applying an IOT model 204-208 in behavioral model meta-language 212 to feature data 210. In other words, analytics evaluation primitives 214, such as derived data structures, modified data, and such may be retrieved from feature data 210 which may be embedded in data packets and the like sent across a data plane.

IOT model deployment engine 202 can then provide analytics evaluation primitives 214 to an appropriate analytics engine 216-220 as determined by IOT model 204-208. Depending on the IOT model, one or more analytics engines 216-220 may receive analytics evaluation primitives 214. For example, and without imputing limitation, IOT building model 208 may call for use of a Bayesian analytics engine 220 and also a Dynamic Bayesian Network analytics engine 218 in an ensemble model. In comparison, an IOT manufacturing plant model 206 may use only a Dynamic Bayesian Model 218. As a result of processing analytics evaluation primitives 214 by analytics engine 216-220, various events and/or discerned characteristics may be classified and output as event detections 222 as discussed above.

FIG. 3 depicts a data flow 300 as a result of a model deployed via IOT model deployment engine 202 of FIG. 2. Although network data plane 302 is depicted in FIG. 3 as a single device, this is for explanatory purposes only and it is understood that other network data plane architectures can implement the concepts herein. For example, and without imputing limitation, a network data plane may include multiple and various devices fully within a particular network (e.g., industrial intranet 102) and/or partially or fully outside of the particular network (e.g., communicating with the Internet, etc.). Further, network data planes may include edge compute, fog compute, cloud compute, and the like devices while implementing the concepts herein.

For example, computer terminal 304 may provide a model to network data plane 302 for execution. Network data plane 302 may manage network communications for various devices across a network such as industrial devices 306-308 and network data store 310. Further, network data plane 302 can include part or all of a model deployment engine (e.g., IOT model deployment engine 202 discussed above).

In a typical network environment, industrial device 306 and industrial device 308 may communicate via network data plane 302 in order to manage some industrial process. In example, and for explanatory purposes only without imputing limitation, industrial device 306 may be an automated smelting machine and industrial device 308 may be a temperature based controller. In the same example, network data store 310 may receive event logs and, as such, may receive network transmissions from industrial device 306 (e.g., the automated smelting machine) and industrial device 308 (e.g., the temperature based controller) when certain threshold events occur. Transmissions from industrial devices 306-308 and network data store 310 may include a destination device in a packet header (e.g., in the form of an IP address, etc.) which may then be processed by network data plane 302 to deliver the transmission to the correct network endpoint.

Network data plane 302, having received a model from terminal 304, may then execute the model over appropriate network traffic in addition to managing the network traffic as discussed above. In some examples, network traffic (e.g., which devices are communicating and how they are communicating) may also be a feature ingested by a model executed by network data plane 302. Continuing with the example above, a model executed by network data plane 302 may include as features contents of communications between the automated smelting machine (industrial device 306) and the temperature based controller (industrial device 308), such as temperature values. Further, frequency of transmissions may also be ingested by the model as an input feature. As a result, the model may classify events, which in some examples can then be subsequently reported out to terminal 304.

FIG. 4 depicts a method 400 for detecting events by a model deployed to a data plane. In some examples, method 400 may be performed by system 100 using IOT model deployment engine 202. Furthermore, in some examples, data flow 300 may result from performance of method 400.

A programmable data plane, such as network data plane 302, may receive a trained model (operation 402). In some examples, the trained model may be received in a meta-language representation. However, if it is not, the trained model can be converted to a meta-language representation (operation 404).

Where the programmable data plane converts the trained model to a meta-language representation, the conversion can be performed by devices and nodes included within the programmable data plane. For example, a data plane service or node may provide, as a primary function, a conversion process.

Nevertheless, the converted model may then be deployed to the data plane (operation 406). In particular, the data plane may be the programmable data plane discussed above. The programmable data plane can execute functional primitives and generate evaluation analytics primitives and the like in order to execute the converted and deployed model.

Features to be fed to the deployed model may be extracted from network data streaming across the data plane (operation 408). In some examples, network traffic between various devices can be processed in order to extract the features for ingestion by the deployed model. For example, where a temperature reading of a particular device is an ingested feature of the deployed model, the temperature may be extracted from communications over the network between the particular device and, for example, a controller device which receives temperature data. In effect, the particular device does not have to be polled for the respective feature. In particular, where a device is unable to output the sought feature directly to the deployed model, the feature may still be extracted from the network data and ingested by the model for proper execution.

Having ingested the extracted features, the deployed model can generate outputs such as event classifications or a hidden state of a subsystem and the like (operation 410). In some examples, the classifications can be used for other models (e.g., as part of an ensemble model, recursive model, feature input for another model, etc.) or be transmitted to downstream processes, services, and/or devices such as online learning services and the like.

The trained model can be produced as depicted by FIG. 5 and according to method 500. Method 500 may be performed by, for example, computer terminal 104, computer terminal 304, or other devices as will be apparent to a person having ordinary skill in the art. In some examples, method 500 may be performed via computer assisted design (CAD) programs as a script, widget, or add-on, etc.

A graphical description of a selected system may first be produced (operation 502). In some examples, this can be accomplished by a domain specialist and/or using a computer assisted design (CAD) program. The graphical description identifies, for example and without imputing limitation, devices, features, relationships, systems, and subsystems to be included in a model. For example, a graphical system description of a manufacturing system may include an automated smelting device and a temperature based controller as well as communications linkages and subsystems within the device and controller such as temperature probe, heating elements, signal processor, and the like.

The graphical system description can be converted into a machine learning model (operation 504). The model may be, for example and without imputing limitation, a Bayesian model, Dynamic Bayesian Model, a Support Vector Machine, Neural Network, regression, or other trainable model as will be apparent to a person having ordinary skill in the art.

The model can then be trained (operation 506). Training may be performed by correcting error values between predicted outcomes and known true outcome values. Based on the error values, components of the model undergoing training can be updated accordingly. For example, back propagation, evolutionary algorithms, gradient descent, and the like may be used individually or in combination to perform training updates as will be apparent to a person having ordinary skill in the art.

Once trained, the model may be transmitted to a deployment platform such as IOT model deployment engine 202

(operation 508). In some examples, IOT model deployment engine 202 may perform method 400 using the trained model produced by method 500. Furthermore, in some examples, model training can continue after deployment of the trained model via, for example, online learning, batched updates, and the like.

Although the system shown in FIG. 6 is one specific network device of the present disclosure, it is by no means the only network device architecture on which the concepts herein can be implemented. For example, an architecture including a CPU 604 having a single processor 608 that handles communications as well as routing computations, etc., can be used. Further, other types of interfaces and media could also be used with the network device 600.

Regardless of the network device's configuration, it may employ one or more memories or memory modules (including memory 606) configured to store program instructions operable by processor 608 for the general-purpose network operations and mechanisms for training, deployment, and routing procedures described herein. The program instructions may control the operation of an operating system and/or one or more applications utilizing interfaces 602 for external communications and integrations, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

FIG. 7 is a schematic block diagram of an example computing device 700 that may be used with one or more embodiments described herein e.g., as any of the discussed above or to perform any of the methods discussed above, and particularly as specific devices as described further below. The device may comprise one or more network interfaces 710 (e.g., wired, wireless, etc.), at least one processor 720, and a memory 740 interconnected by a system bus 750, as well as a power supply 760 (e.g., battery, plug-in, etc.).

Network interface(s) 710 contain the mechanical, electrical, and signaling circuitry for communicating data over links coupled to the network 100, e.g., providing a data connection between device 700 and the data network, such as the Internet. The network interfaces may be configured to transmit and/or receive data using a variety of different communication protocols. For example, interfaces 710 may include wired transceivers, wireless transceivers, cellular transceivers, or the like, each to allow device 700 to communicate information to and from a remote computing device or server over an appropriate network. The same network interfaces 710 also allow communities of multiple devices 700 to interconnect among themselves, either peer-to-peer, or up and down a hierarchy. Note, further, that the nodes may have two different types of network connections 710, e.g., wireless and wired/physical connections, and that the view herein is merely for illustration. Also, while the network interface 710 is shown separately from power supply 760, for devices using powerline communication (PLC) or Power over Ethernet (PoE), the network interface 710 may communicate through the power supply 760, or may be an integral component of the power supply.

Memory 740 comprises a plurality of storage locations that are addressable by the processor 720 and the network interfaces 710 for storing software programs and data structures associated with the embodiments described herein. The processor 720 may comprise hardware elements or hardware logic adapted to execute the software programs and manipulate the data structures 745. An operating system 742, portions of which are typically resident in memory 740 and executed by the processor, functionally organizes the device by, among other things, invoking operations in support of software processes and/or services executing on the device. These software processes and/or services may comprise one or more functional processes 746, and on certain devices, an illustrative "dynamic policy" process 748, as described herein. Notably, functional processes 746, when executed by processor(s) 720, cause each particular device 700 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes executed by processor 720.

As noted above, IoT networks present new challenges to network and security policies. In particular, the Manufacturer Usage Description (MUD) Specification (draft-lear-ietf-netmod-mud-04) describes how a policy engine/authentication server can harvest a MUD uniform resource identifier (URI) presented by an Internet of Things (IoT) device. It then resolves the MUD URI and creates network policy for the IoT device, and forwards the access policy to the access port to which the IoT device is attached. This effectively limits the access of the IoT device to the network. An IoT device typically has a limited number of servers to which it must communicate. Most times there is a need to apply policy relating to the device (or class of devices) on the path between the IoT device and its servers. Enterprise network and security devices along this path of communication need to be provisioned with the right quality of service, firewall pinhole, or other types of network or security policy. With numerous IoT devices, which each class of device communicating using different methods, it is impossible to have a predefined static access control policy throughout the network.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for executing a model in an Internet-of-Things (IOT) operations environment, the method comprising:
    obtaining, by a processor, a machine learning model, the trained model generating classifications from features of an IOT operations environment, the IOT operations environment comprising one or more IOT devices on a network and the features comprising performance characteristics of one of subsystems or device components of the IOT devices;
    converting, by the processor, the model into a meta-language representation, the meta-language representation interpretable by a data plane engine, the meta-language representation including an extract primitive for identifying features from the IOT environment;
    deploying, by the processor, the converted model to a data plane, the data plane comprising network communications in the IOT operations environment and including the data plane engine;
    extracting, by the processor and the data plane engine and based on the identified features of the extract primitive of the meta-language representation of the model, the features of the IOT operations environment from the network communications;
    feeding, by the processor, the extracted features to the deployed model; and
    generating from the ingested features, by the processor and the deployed model, one of an event classification or device state classification for the one or more IOT devices of the IOT operations environment.

2. The method of claim 1, wherein the data plane engine comprises functional primitives.

3. The method of claim 1, further comprising:
    generating, by a processor, a graphical system description of an IOT operations environment;
    converting, by the processor, the graphical system description into a machine learning model; and
    training, by the processor, the machine learning model.

4. The method of claim 1, further comprising:
    logging, by the processor, the ingested features and the one of the event classification or device state classification; and
    providing, by the processor and to a model trainer, the logged ingested features and the one of the event classification or device station classification.

5. The method of claim 1, further comprising:
    updating, by the processor, the converted model using the ingested features and the one of the event classification or device state classification; and
    redeploying, by the processor, the updated converted model to the data plane, the redeployed model replacing the deployed model.

6. The method of claim 1, further comprising:
    generating, by a second processor, a machine learning model by:
        feeding to a machine learning model, one or more features of one or more IOT devices;
        generating, by the second processor executing the machine learning model on the received one or more features, a classification;
        determining, by the second processor, an error value based on the classification and a predetermined true value;
        generating, by the second processor, a trained machine learning model by updating the machine learning model based on the determined error value; and
        providing, from the second processor, the trained machine learning model to be deployed in an IOT operations environment.

7. A system for executing a model in an Internet-of-Things (IOT) operations environment, the system comprising:
    an IOT operations environment comprising one or more IOT devices on a network;
    a data plane comprising communications over the network and a data plane engine, the communications between the one or more IOT devices;
    a processor; and
    a memory storing instructions comprising:
        obtain a machine learning model, the model generating classifications from features of the IOT operations environment, the features comprising performance characteristics of one of subsystems or device components of the IOT devices;
        convert the model into a meta-language representation, the meta-language representation interpretable by the data plane engine, the meta-language representation including an extract primitive for identifying features from the IOT environment;
        deploy the converted model to the data plane;
        extract the features of the IOT operations environment from the communications over the network and based on the identified features of the extract primitive of the meta- language representation of the model;
        feed the extracted features to the deployed model; and
        generate from the ingested features, by the deployed model, one of an event classification or device state classification for the one or more IOT devices of the IOT operations environment.

8. The system of claim 7, wherein the data plane engine comprises functional primitives.

9. The system of claim 7, wherein the memory stores instructions further comprising:
    log the ingested features and the one of the event classification or device state classification; and
    provide, to a model trainer, the logged ingested features and the one of the event classification or device station classification.

10. The system of claim 7, wherein the memory stores instructions further comprising:
    update the converted model using the ingested features and the one of the event classification or device state classification; and
    redeploy the updated converted model to the data plane, the redeployed model replacing the deployed model.

11. The system of claim 7, further comprising a graphical system description of the IOT operations environment, wherein the memory stores instructions further comprising:

convert the graphical system description into a machine learning model; and train the machine learning model.

12. A non-transitory computer readable medium storing instructions programmed to cause a system to perform operations comprising:

obtain a machine learning model, the model generating classifications from features of an IOT operations environment, the IOT operations environment comprising one or more IOT devices on a network and the features comprising performance characteristics of one of subsystems or device components of the IOT devices;

convert the model into a meta-language representation, the meta-language representation interpretable by a data plane engine, the meta-language representation including an extract primitive for identifying features from the IOT environment;

deploy the converted model to a data plane, the data plane comprising network communications in the IOT operations environment and including the data plane engine;

extract, by the data plane engine and based on the identified features of the extract primitive of the meta-language representation of the model, the features of the IOT operations environment from the network communications;

feed the extracted features to the deployed model; and generate from the ingested features, by the deployed model, one of an event classification or device state classification for the one or more IOT devices of the IOT operations environment.

13. The non-transitory computer readable medium of claim 12, wherein the data plane engine comprises functional primitives.

14. The non-transitory computer readable medium of claim 12, storing instructions further comprising:

generate a graphical system description of an IOT operations environment;

convert the graphical system description into a machine learning model; and train the machine learning model.

15. The non-transitory computer readable medium of claim 12, storing instructions further comprising:

log the ingested features and the one of the event classification or device state classification; and provide, to a model trainer, the logged ingested features and the one of the event classification or device station classification.

16. The non-transitory computer readable medium of claim 12, storing instructions further comprising:

update the converted model using the ingested features and the one of the event classification or device state classification; and redeploy the updated converted model to the data plane, the redeployed model replacing the deployed model.

17. The non-transitory computer readable medium of claim 12, storing instructions further comprising:

generate a machine learning model by:
feeding to a machine learning model, one or more features of one or more IOT devices;
generating, by executing the machine learning model on the received one or more features, a classification;
determining an error value based on the classification and a predetermined true value;
generating a trained machine learning model by updating the machine learning model based on the determined error value; and
providing the trained machine learning model to be deployed in an IOT operations environment.

18. The method of claim 1, wherein the features identified by the extract primitive include subsystem device state, communications target, or time-dimension data.

19. The system of claim 7, wherein the features identified by the extract primitive include subsystem device state, communications target, or time-dimension data.

20. The non-transitory computer readable medium of claim 12, wherein the features identified by the extract primitive include subsystem device state, communications target, or time-dimension data.

* * * * *